United States Patent [19]

Peters et al.

[11] Patent Number: 4,709,955
[45] Date of Patent: Dec. 1, 1987

[54] DEVICE FOR TRANSPORTING TREES AND THE LIKE

[75] Inventors: Douglas C. Peters, Chaska; Charles S. Hansen, Eagan, both of Minn.

[73] Assignee: Art Dahlquist, Burnsville, Minn.

[21] Appl. No.: 11,618

[22] Filed: Feb. 6, 1987

[51] Int. Cl.[4] ............................................. B60P 3/00
[52] U.S. Cl. .......................................... 296/3; 414/23
[58] Field of Search .................. 296/3; 414/23; 47/76

[56] References Cited

U.S. PATENT DOCUMENTS

| | | | |
|---|---|---|---|
| 569,042 | 10/1896 | Halling | 414/23 |
| 2,105,353 | 1/1938 | Irish | 414/23 |
| 2,198,690 | 4/1940 | Wilmore | 414/23 |
| 2,849,125 | 8/1958 | Beseler | 414/23 |
| 2,990,630 | 7/1961 | Crawford | 414/23 |
| 3,017,719 | 1/1962 | Sigler et al. | 414/23 |
| 3,032,368 | 5/1962 | Sigler et al. | 296/3 |
| 3,778,098 | 12/1973 | Tawara | 296/3 |
| 3,782,773 | 1/1974 | Mason | 296/3 |
| 4,114,766 | 9/1978 | Decker et al. | 414/23 |
| 4,351,253 | 9/1982 | Dahlquist | 296/3 |
| 4,402,148 | 9/1986 | Schiffelbein | 296/3 |

*Primary Examiner*—Robert R. Song

*Attorney, Agent, or Firm*—Peterson, Wicks, Nemer & Kamrath

[57] ABSTRACT

A device for transporting trees and the like is shown in the preferred embodiment as a trailer including front, center, and rear frame portions. The front frame portion includes a connector for connecting to a power unit and the rear portion includes wheels for providing mobility. The center frame portion is pivotally mounted to and between the front and rear frame portions about a frame pivot axis. Hydraulic actuators are provided for pivoting the center frame portion about the frame pivot axis. First and second pods are pivotably mounted to the center frame portion about pod pivot axes which are perpendicular to the frame pivot axis. Hydraulic actuators are further provided for pivoting the pods about the pod pivot axes. Thus, the pods can be positioned at an angle to the horizontal by pivoting the center frame portion allowing easy placement and removal of the root and dirt ball intact within the pod by a tree spade or by pivoting the pod allowing the tree carried by the pod to be pivoted at an angle to the travel surface and within the width of the device allowing the transport of trees along conventional roadways and under bridges and the like.

15 Claims, 3 Drawing Figures

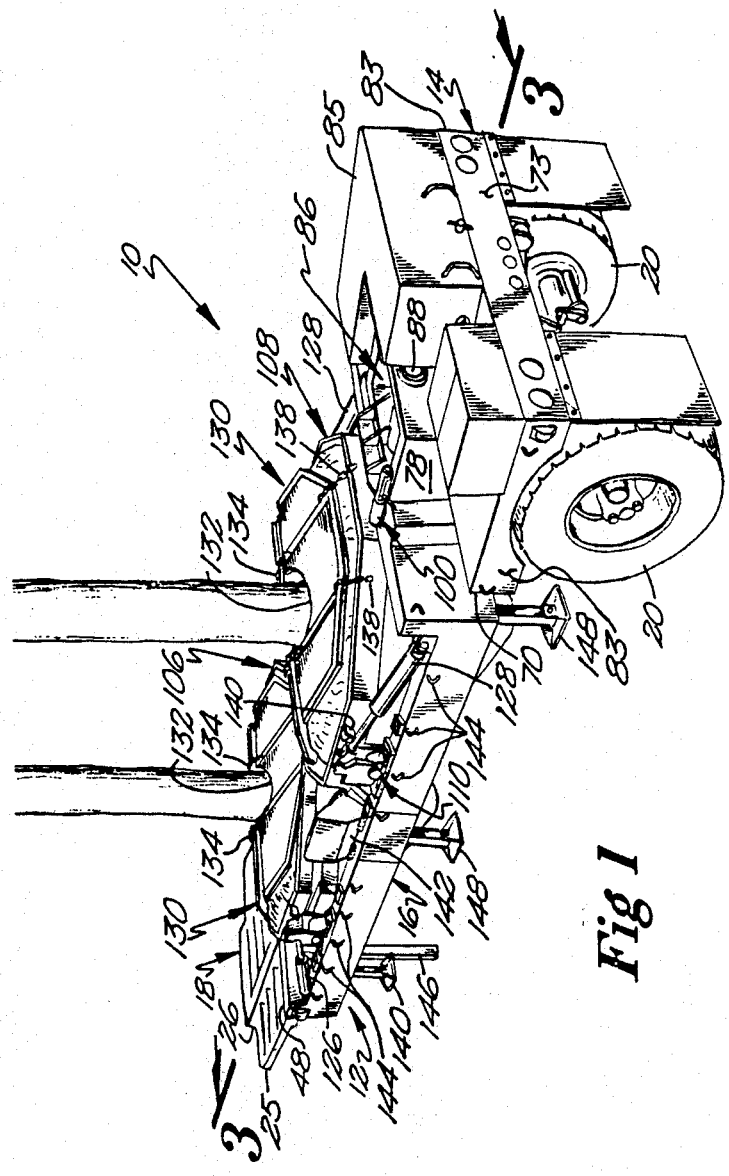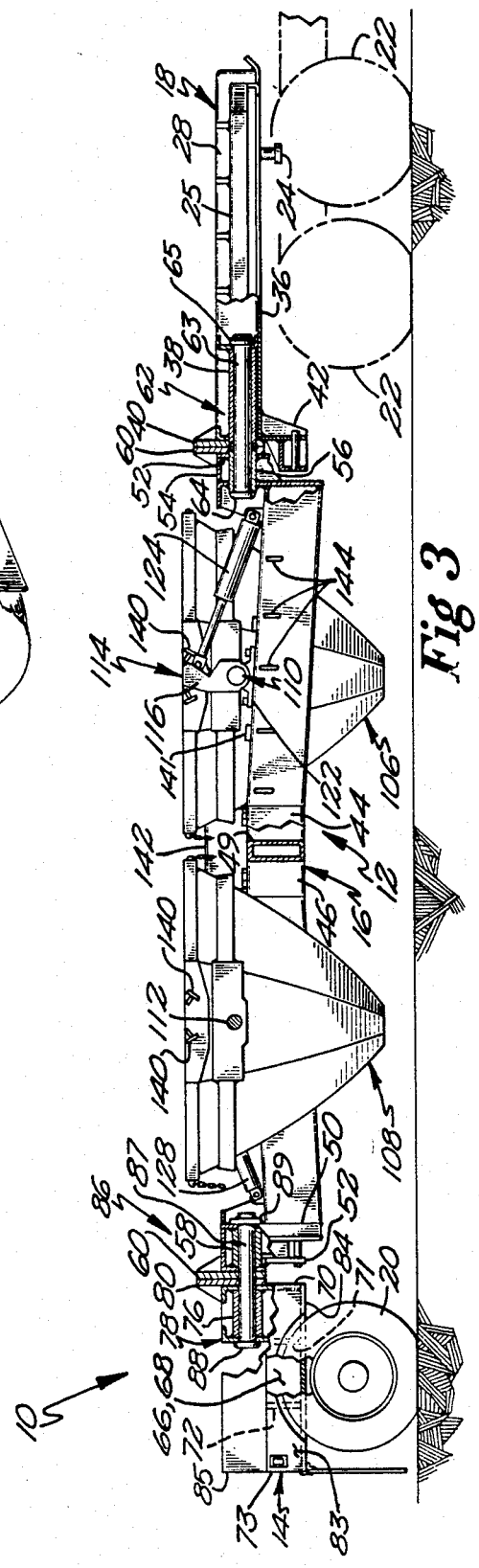

DEVICE FOR TRANSPORTING TREES AND THE LIKE

BACKGROUND

The present invention relates generally to transport devices and more specifically to devices for transporting trees and the like.

The rate of growth of trees and other vegetation is relatively long in comparison to human life. Thus, many years may be required for a tree to develop from a sapling to a relatively mature tree. During landscaping, it is more desireable to transplant more mature trees than to wait for the transplanted trees to mature. Thus, a need has arisen for a device for transporting trees throughout conventional roadways without interfering with electric, telephone, or like wires, bridges, tunnels, underpasses, and the like. Further, such devices should allow easy loading and removal of trees with the root and dirt ball intact from the transport device.

SUMMARY

The present invention solves this and other needs by providing, in the preferred embodiment, a pod for carrying the root ball of a tree and the like. The pod is pivotally mounted about a first pivot axis which is generally parallel to the transport movement direction and a second pivot axis which is generally perpendicular to the transport movement direction. Members are further provided for pivoting the pod about the first pivot axis and the second pivot axis.

Thus, it is an object of the present invention to provide a novel device for transporting trees and the like.

It is also an object of the present invention to provide such a novel transport device which can be easily loaded with a tree spade.

It is also an object of the present invention to provide such a novel transport device which can transport trees having a height in the range of 35 feet.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 1 shows a perspective view of a trailer for transporting trees and the like according to the teachings of the present invention.

FIG. 3 shows a cross sectional view of the trailer of FIG. 1 according to section line 3—3 of FIG. 1.

Figure 2:
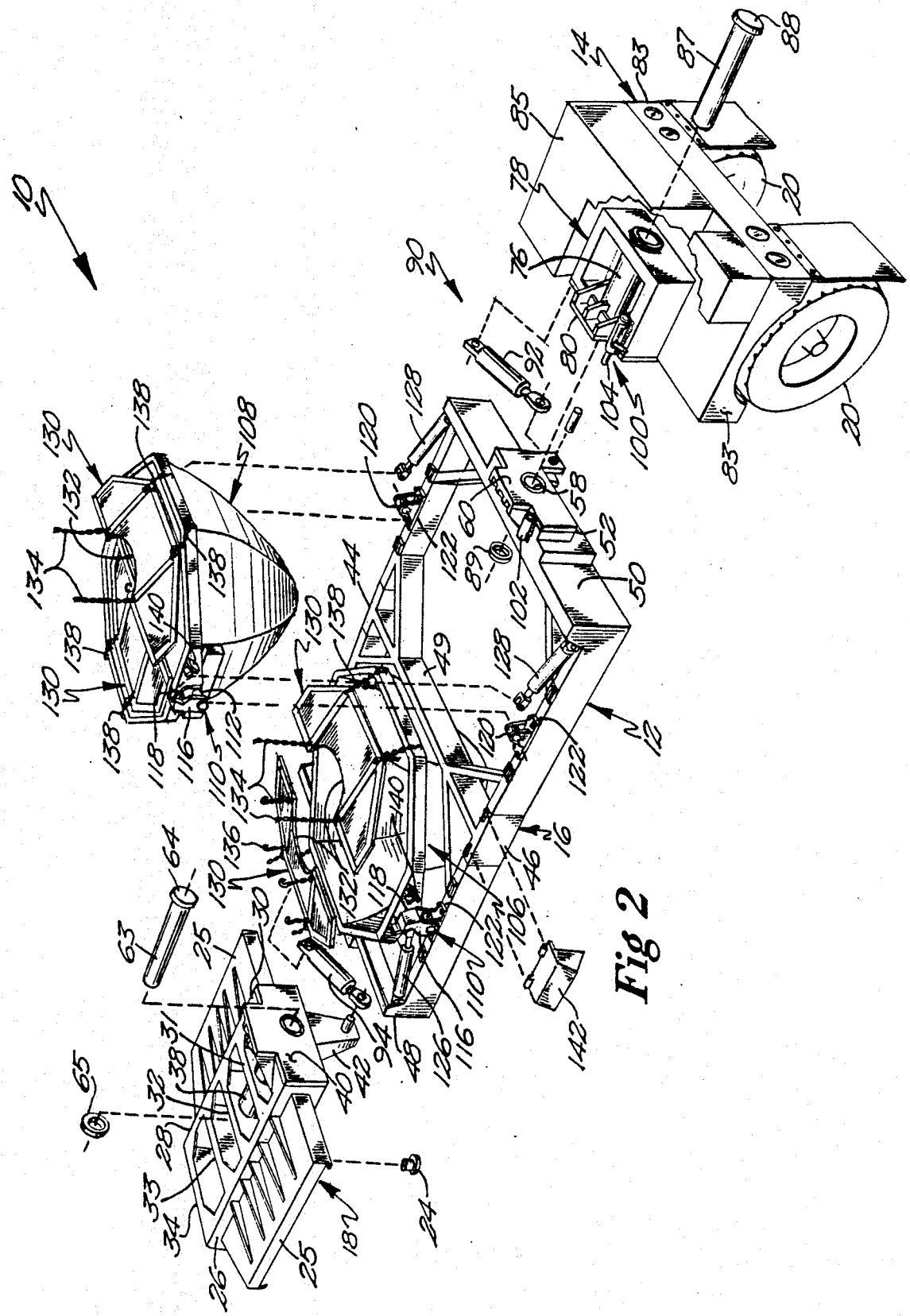
FIG. 2 shows an exploded perspective view of the trailer of FIG. 1, with portions of the trailer being removed.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "inside", "outside", and similar terms are used herein, it should be understood that these terms have reference only to the structure shown in the drawings as it would appear to a person viewing the drawings and are utilized only to facilitate describing the invention.

DESCRIPTION

A device for transporting trees and the like according to the teachings of the present invention is shown in the drawings in its most preferred form as a trailer and is generally designated 10. Trailer 10 includes a frame 12 shown in its preferred form as having a rear portion 14, a middle or central portion 16, and a front portion 18. Frame 12 may be supported at its rear end by a pair of double wheels 20 or any other suitable means of mobility secured to rear portion 14. Frame 12 may be supported at its front end by a truck tractor or other suitable vehicle 22 and may be connected thereto by any suitable means 24 such as a standard fifth wheel connector secured to front portion 18 as shown in the drawings. It can then be appreciated that trailer 10 can be attached to a source of mobility by any suitable method in addition to a fifth wheel connector as shown such as by utilizing a trailer tongue for purposes of transporting trailer 10 over the travel surface such as conventional roadways. Likewise, transport device 10 according to the teachings of the present invention may be utilized in other forms than a trailer as shown and described in its most preferred form.

Front portion 18 generally includes first and second, longitudinally extending side members 26 and 28 held in a parallel relation by parallel, spaced cross braces 30–34. A brace plate 36 extends between members 26 and 28 and braces 30 and 34 and is secured to members 26 and 28 and braces 30–34 to provide a rigid construction. In its most preferred form, connector 24 is located on brace plate 36 extending between side members 26 and 28 and cross braces 32 and 33. A longitudinally extending cylindrical bushing 38 extends between braces 30 and 31 and is secured thereto. A wear plate 40 is secured to the rear end of bushing 38 and to brace 30. A cylinder pin mount 42 extends beyond and below the rear end of bushing 38 and is secured to and braced against plate 36. Fenders 25 may be provided secured to side members 26 and 28 for covering the wheels of the truck tractor 22 interconnector to trailer 10 by connector 24.

In the preferred embodiment, side members 26 and 28 have a length in the range of 79 inches and cross braces 30–34 have a length in the range of 40 inches. Side members 26 and 28, braces 30–34 and plate 36 secured thereto have a combined thickness in the range of 9½ inches. Connector 24 is located midway between the length of braces 30–34 and generally in the range of 24 inches from the front of brace 34 of portion 18. In its most preferred form, plate 36 is located in the range of 50 inches above the travel surface when trailer 10 is connected to vehicle 22. Bushing 38 in its most preferred form is formed of an 8 inch outside diameter tube and lies along a longitudinal axis midway between side members 26 and 28 and midway between the length of braces 30–34. The cylinder pin mount 42 extends in the range of 9 inches below plate 36 with the cylinder pin being located in the range of 5 inches below plate 36. Wear plate 40 has a thickness in the range of ½ inch and extends the thickness of side members 26 and 28, braces 30-34, and plate 36 and in the range of 4 inches above the top of brace 30.

Middle portion 16 generally includes first and second, longitudinally extending side members 44 and 46 held in a parallel relation by parallel, spaced, cross braces 48-50. In its most preferred form, brace 49 extends between side members 44 and 46 generally midway their length. Further, in its most preferred form, side members 44 and 46 are secured to braces 48 and 50 through their entire height and braces 48 and 50 extend beyond the top surfaces of side members 44 and 46 by a height in the range of the height of side members 44 and 46. Secured to the front and rear cross braces 48 and 50 are parallel frame plates 52 held in a spaced relation by spacer plates 54. A longitudinally extending, cylindrical bushing 56 extends between and through cross brace 48 and frame plate 52 and cylindrical bushing 58 extends between and through cross brace 50 and frame plate 52. Wear plates 60 are secured to bushings 56 and 58 and to braces 48 and 50, respectively.

In the preferred embodiment, the length of middle portion 16 is in the range of 208 inches and the length of side members 44 and 46 is in the range of 196 inches. Cross braces 48-50 have a length in the range of 102 inches. Braces 48 and 50 have a thickness in the range of 4 inches and brace 49 has a thickness in the range of 2 inches. Sides members 44 and 46 have a thickness in the range of 5½ inches. The length of frame plate 52 is in the range of 56 inches and frame plate 52 is located midway between side member 44 and 46 and midway between the length of braces 48 and 50. The height of frame plate 52 is in the range of 13½ inches and the total height of braces 48 and 50 and side member 44 and 46 is in the range of 27 inches. Bushings 56 and 58 in their most preferred form are formed of 8 inch outside diameter tubes and lie along a longitudinal axis midway between side members 44 and 46. Wear plates 60 have a thickness in the range of ½ inch and extend the diameter of bushings 56 and 58 and in the range of 4 inches above the top of the top spacer plate 54.

Suitable provisions 62 are provided for pivotally relating front and middle portions 18 and 16 about a longitudinal axis and is shown in the preferred form as a pin member 63 rotatably received in bushing 38 of front portion 18 and rotatably received in bushing 56 of middle portion 16 but prevented from moving longitudinally therein. Pin member 63 in its most preferred form is formed of a 7 inch outside diameter tube and includes a head 64 which abuts with the end of bushing 56 opposite wear plate 60. A collar 65 is removably received on pin member 63 such as by welding for abutting with the end of bushing 38 opposite wear plate 40.

Rear portion 14 generally includes first and second, longitudinally extending side members 66 and 68 held in a parallel relation by parallel, spaced, cross braces 70-73. A longitudinally extending cylindrical bushing 76 extends in a box-like member 78 located between and above cross braces 70 and 71. A wear plate 80 is secured to the front end of bushing 76 and to member 78. A cylinder pin mount 82, not specifically shown, of similar construction to mount 42 extends beyond and below the front end of brace 70 and rear portion 14 and is secured to and braced against a plate 84 extending between braces 70 and 71.

In the preferred embodiment, side members 66 and 68 have a length in the range of 48 inches and a height in the range of 9½ inches. Braces 70-73 have a length in the range of 40 inches. Box-like member 78 has a height of 12¾ inches. Bushing 76 in its most preferred form is formed of an 8 inch outside diameter tube and lies along a longitudinal axis midway between side members 66 and 68. Wear plate 80 has a thickness in the range of ½ inch and extends the diameter of bushing 76 and in the range of 4 inches above the top of box-like member 78. The cylinder pin mount 82 extends in the range of 9 inches below plate 84 with the cylinder pin being located in the range of 5 inches below plate 84.

In its most preferred form, rear portion 14 includes fenders 83 secured to side members 66 and 68 for covering wheels 20 of rear portion 14. Storage boxes 85 secured to fenders 83 and rear portion 14 are further provided in the most preferred form. Boxes 85 may include a hydraulic system including a power source such as a gasoline engine and may provide storage for gasoline and hydraulic oil containers, tools, tree transporting paraphenalia such as tarps, ropes, elastic straps, and the like, and other desired objects.

Suitable provisions 86 are provided for pivotally relating rear and middle portions 14 and 16 about a longitudinal axis and is shown in the preferred form as a pin member 87 rotatably received in bushing 76 of rear portion 14 and rotatably received in bushing 58 of portion 16 but prevented from moving longitudinally therein. Pin member 87 in its most preferred form is formed of a 7 inch outside diameter tube and includes a head 88 which abuts with the end of bushing 76 of rear portion 14 opposite wear plate 80. A collar 89 is removably received on pin member 87 such as by welding for abutting with the end of bushing 58 of portion 16 opposite wear plate 60.

Further suitable provisions 90 are provided for pivoting middle portion 16 about pivot members 62 and 86 with respect to front and rear portions 18 and 14, respectively, and are shown in the preferred form as hydraulic actuators 92 and 94. Actuator 92 has a first end pivotally mounted by a pin of mount 82 and a second end pivotally mounted by a pin extending between brace 50 and frame plate 52. Similarly, actuator 94 has a first end pivotally mounted by a pin of mount 42 and a second end pivotally mounted by a pin extending between brace 48 and frame plate 52.

In the preferred embodiment, trailer 10 including rear, center, and front portions 14, 16, and 18 interconnected together by provisions 62 and 86 has a combined length in the range of 337 inches.

Suitable provisions 100 may further be provided for preventing pivoting of middle portion 18 about pivot members 62 and 86 with respect to front and rear portions 18 and 14 and is shown in its most preferred form as a sliding, dead bolt type lock. Specifically, lock 100 includes a socket 102 mounted on brace 50 for receiving a bolt 104 longitudinally slideably mounted on box member 78 of rear portion 14. Bolt 104 is longitudinally slideable about an axis which is in a spaced relation from the longitudinal axis of pivot member 86.

Trailer 10 further includes first and second pods 106 and 108. Pods 106 and 108 may be in the form of a right cone as shown in the drawings or can be of other forms utilizing the teachings of the present invention. Suitable provisions 110 are provided for pivotally mounting pods 106 and 108 to middle portion 16 along an axis generally perpendicular to the longitudinal axis of pivot members 62 and 86. Specifically, pivot pins 112 are provided welded or otherwise secured on opposite sides of pods 106 and 108. A cylinder bracket 114 is then further provided welded or otherwise secured to pins 112. Bracket 114 is shown in its most preferred form as parallel spaced plates 116 and 118. A bushing 120 is located between plates 116 and 118 and rotatably received on pin 112. Bushing 120 is secured to frame portion 16 such as by plates 122 welded or otherwise secured to bushing 120 in turn bolted or otherwise secured to side members 44 and 46 of middle portion 16. Thus, bushings 120 pivotally mount pods 106 and 108 by their rotatable receipt of pins 112 and prevent lateral movement due to their capture between plates 116 and 118 of bracket 114 welded to pins 112.

Suitable provisions 124 are provided for pivoting pods 106 and 108 about pivot pins 112 and is shown in its preferred form as first and second sets of hydraulic actuators 126 and 128. Actuators 126 have their first ends pivotally secured to side members 44 and 46 adjacent to brace 48 and their second ends pivotally secured to brackets 114 of pod 106 in a spaced relation to pins 112. Actuators 128 have their first ends pivotally secured to side member 44 and 46 adjacent to brace 50 and their second ends pivotally secured to brackets 114 of pod 108 in a spaced relation to pins 112. It can then be appreciated that pods 106 and 108 may be independently pivoted in either direction about pins 122 such that trees located in pods 106 and 108 can be both tipped in a forward direction, both tipped in a rearward direction, or tipped in opposite directions.

Suitable covers 130 may be provided for covering the open top of pods 106 and 108. In their most preferred form, covers 130 are of identical construction and have a size generally equal to one half of the open top of pods 106 and 108. Covers 130 generally include a removed portion 132 for allowing a tree trunk to pass therethrough. Covers 130 generally include chains 134 located on opposite sides of removed portion and adjacent the diametric edge of covers 130. Chains 136 are further provided on the perimeter edge of covers 130 at a radial position generally perpendicular to the diametric edge. Covers 130 can be secured to each other by interconnecting chains 134 between adjacent covers and may be secured to pods 106 and 108 by interconnecting chains 136 with chains 138 at complementary positions on pods 106 and 108 adjacent its open top.

Provisions 140 may be provided for preventing pods 106 and 108 from pivoting about pins 112 beyond the desired angle. In its most preferred form, provisions 140 are shown as stops formed on pods 106 and 108 on opposite sides of pins 112 for purposes of abutting with side members 44 and 46 of middle portion 16 and thus preventing further pivoting of pods 106 and 108. In its most preferred form, blocks 141 are provided on side members 44 and 46 with which stops 140 engage.

Middle portion 16 may further include a bumper 142 pivotably mounted to the topside of side members 44 and 46 for movement between a first transport position shown in FIG. 1 located within the confines of middle portion 16 to reduce the overall trailer width during transport over roadways and a second position against the side of middle portion 16 for acting as a bumper for a tree spade or other loading device for preventing damaging contact with side members 44 and 46.

Trailer 10 may further include suitable tie downs 144 as shown for allowing securement of tarps thrown over trees located in pods 106 and 108 by rope or elastic straps secured thereto. Steps may further be provided for allowing persons to more easily climb on trailer 10 to place tarps on the trees being transported, for placing or removing covers 130 on pods 106 and 108, or for other reasons.

Trailer 10 may further include provisions 146 for support of the trailer 10 in a horizontal position when vehicle 22 is not connected thereto. For example, peg legs can be provided lockably, slideably mounted to middle portion 16 as shown or convention trailer dollies may be utilized.

Middle portion 16 may include stops 148 secured to the underside of side members 44 and/or 46 for abutting with the ground when middle portion 16 is in a tilted position for preventing pivoting of middle portion 16 with respect to portions 14 and 18 therebeyond. Thus, excessive force is not placed on hydraulic actuators 92 and 94 during loading of pods 106 and 108 by a tree spade or the like.

Now that the construction of trailer 10 according to the teachings of the preferred embodiment of the present invention has been set forth, advantages and subtle features of trailer 10 can also be set forth and appreciated. Specifically, pods 106 and 108 can be pivoted about the longitudinal axis of trailer 10 allowing easy placement and removal of the root and dirt ball intact within pods 106 and 108 by a tree spade. Specifically, pods 106 and 108 can be pivoted about the longitudinal axis by extending or retracting actuators 92 and 94 and pivoting middle portion 16 of trailer 10 with respect to rear and front portions 14 and 18 about pivotably mounting provisions 62 and 86. After pods 106 and 108 have been loaded, middle portion 16 can be pivoted to its horizontal, transport position and locked in position by lock 100.

Additionally, pods 106 and 108 can be pivoted about axes which are perpendicular to the longitudinal axis of trailer 10 allowing the trees carried by pods 106 and 108 to be pivoted at an angle to the travel surface within the width of trailer 10 allowing the transport of trees along conventional roadways and under bridges and the like. Specifically, pods 106 and 108 can be pivoted about pins 112 by extending or retracting actuators 126 and 128 and pivoting pods 106 and 108 with respect to middle portion 16 of trailer 10. Since pods 106 and 108 are at an angle, trees located in pods are not perpendicular to the travel surface but are an angle thereto. It can then be appreciated that the closer the trees are to being parallel to the travel surface, the lesser the overall height of the trees. Thus, utilizing trailer 10 according to the teachings of the present invention, trees having a height in the range of 35 feet can be transported over conventional roadways which have restricted heights in the range of 12 feet.

Now that the basic teachings of the present invention have been explained, many extensions and variations will be obvious to one having ordinary skill in the art. For example, although the present invention is shown in its most preferred form as a trailer for connection to a vehicle such as by a standard fifth wheel connector, the teachings of the present invention may be applied to other forms and types of transport devices by persons having ordinary skill in the art after the teachings of the present invention become known.

Likewise, although provisions 100 for preventing pivoting of portion 16 is shown as a manually actuated, dead bolt type lock, other types of locking means may be provided according to the teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Trailer for transporting trees and the like comprising, in combination: a front frame section; a center frame section; a rear frame section, with the front frame section including means for connection to a powered vehicle, with the rear frame section including wheels for providing mobility along the travel surface; means for pivotably mounting the center frame section to the front frame section about a frame portion pivot axis; means for pivotably mounting the center frame section to the rear frame section about the frame portion pivot axis; at least a first pod for carrying the root ball of a tree and the like; means for pivotably mounting the pod to the center frame section about a pod pivot axis, with the frame portion pivot axis being perpendicular to the pod pivot axis; means for pivoting the pod about the pod pivot axis; and means for pivoting the center frame section about the frame portion pivot axis.

2. The device of claim 1 further comprising, in combination: means for releasably locking the center frame section against rotation about the frame portion pivot axis.

3. The device of claim 2 wherein the releasably locking means comprises, in combination: a socket mounted on one of the rear frame section and the center frame section; and a bolt slideably mounted to the other of the rear frame section and the center frame section for slideable movement in a parallel, spaced relation to the frame portion pivot axis and for receipt within the socket.

4. The device of claim 3 wherein the center frame section includes first and second side members which are parallel to but spaced from each other and from the frame portion pivot axis; wherein the pod pivotably mounting means comprises, in combination: first and second pivot pins extending along the pod pivot axis on opposite sides of the pod; and first and second cylindrical bushings mounted on the first and second side members and through which the first and second pivot pins are pivotably received and wherein the pod pivoting means comprises, in combination: at least a first bracket on the first pivot pin comprising a first plate and a second plate attached to the first pivot pin on opposite sides of the first cylindrical bushing, with the first plate being parallel to the second plate; at least a first hydraulic actuator having a first end pivotably anchored to the first side member of the frame portion and a second end pivotably anchored to the first bracket between the first and second plates.

5. Device for transporting trees and the like comprising, in combination: at least a first pod for carrying the root ball of a tree and the like; a frame portion; means for pivotably mounting the pod to the frame portion about a pod pivot axis; means for pivoting the pod about the pod pivot axis; means for pivotably mounting the frame portion about a frame portion pivot axis, with the frame portion pivot axis being perpendicular to the pod pivot axis; means for pivoting the frame portion about the frame portion pivot axis; and means for allowing movement of the frame portion along a travel surface.

6. The device of claim 5 wherein the movement allowing means comprises, in combination: a front frame section, a rear frame section, with the front frame section including means for connection to a powered vehicle, with the rear frame section including wheels for providing mobility along the travel surface, and wherein the frame portion pivotably mounting means comprises, in combination: means for pivotably mounting the frame portion to the front frame section about the frame portion pivot axis; and means for pivotably mounting the frame portion to the rear frame section about the frame portion pivot axis.

7. The device of claim 6 further comprising, in combination: means for releasably locking the frame portion against rotation about the frame portion pivot axis.

8. The device of claim 7 wherein the releasably locking means comprises, in combination: a socket mounted on one of the rear frame section and the frame portion; and a bolt slideably mounted to the other of the rear frame section and the frame portion for slideable movement in a parallel, spaced relation to the frame portion pivot axis and for receipt within the socket.

9. The device of claim 5 wherein the frame portion includes first and second side members which are parallel to but spaced from each other and from the frame portion pivot axis; wherein the pod pivotably mounting means comprises, in combination: first and second pivot pins extending along the pod pivot axis on opposite sides of the pod; and first and second cylindrical bushings mounted on the first and second side members and through which the first and second pivot pins are pivotably received and wherein the pod pivoting means comprises, in combination: at least a first bracket on the first pivot pin comprising a first plate and a second plate attached to the first pivot pin on opposite sides of the first cylindrical bushing, with the first plate being parallel to the second plate; at least a first hydraulic actuator having a first end pivotably anchored to the first side member of the frame portion and a second end pivotably anchored to the first bracket between the first and second plates.

10. The device of claim 5 wherein the frame portion includes first and second side members which are parallel to but spaced from each other and from the frame portion pivot axis; wherein the device further comprises, in combination: a bumper pivotably mounted to at least one of the first and second side members, with the bumper being pivotably mounted from a first, transport position located within the confines of the frame portion to reduce the overall device width during transport over roadways and a second position against the side member for acting as a bumper for a tree spade or the like for preventing damaging contact with the side member.

11. The device of claim 5 further comprising, in combination: means for removably covering the open top of the pod comprising, in combination: first and second covers of identical shape and having a size generally equal to one half of the open top of the pod and including a diametric edge and a perimeter edge; a removed portion formed in the covers and extending from the diametric edge for placement around a tree trunk extending from the pod; first chains located adjacent the perimeter edge of the covers for interconnecting together for securing the covers together adjacent their diametric edges; second chains located adjacent the perimeter edge of the covers; and third chains located on the pod adjacent the open top for interconnecting together for securing the covers to the pod.

12. The device of claim 6 wherein the rear frame section comprises, in combination: first and second, longitudinally extending side members held in a parallel relation by parallel, spaced, cross braces; and a boxlike member located above and secured to the side members and the cross braces; and wherein the rear frame section pivotably mounting means comprises, in combination: a longitudinally extending cylindrical bushing extending through the box-like member of the rear frame section; a pin member rotatably received in the bushing but prevented from moving longitudinally therein, with the pin member being operatively secured to the frame portion.

13. The device of claim 12 wherein the frame portion comprises, in combination: first and second, longitudinally extending side members held in a parallel relation at least by first and second cross braces located on and secured to the opposite ends of the side members, with the cross braces extending above the side members by a height in the range of the height of the side members; and wherein the rear frame section pivotably mounting means comprises, in combination: a longitudinally extending cylindrical bushing extending through the second cross brace of the frame portion in a position generally above the side members, with the pin member rotatably received in the bushing of the frame portion but prevented from moving longitudinally therein.

14. The device of claim 5 wherein the pod pivoting means comprises, in combination: hydraulic actuators.

15. The device of claim 5 wherein the frame portion pivoting means comprises, in combination: hydraulic actuators.

* * * * *